US008913880B1

(12) United States Patent  
Eidelman et al.

(10) Patent No.: US 8,913,880 B1  
(45) Date of Patent: Dec. 16, 2014

(54) METHOD AND APPARATUS FOR MANAGING VIDEO STORAGE

(71) Applicant: Nice-Systems Ltd.

(72) Inventors: Dan Eidelman, Holon (IL); Yelena Krak, Holon (IL); Eyal Nissani, Kfar-Sava (IL); Doron Girmonski, Ra'anana (IL); Oren Deri, Holon (IL)

(73) Assignee: Nice-Systems Ltd., Ra'anana (IL)

( * ) Notice: Subject to any disclaimer, the term of this patent is extended or adjusted under 35 U.S.C. 154(b) by 62 days.

(21) Appl. No.: 13/924,571

(22) Filed: Jun. 23, 2013

(51) Int. Cl.  
*H04N 5/76* (2006.01)  
*H04N 5/92* (2006.01)  
*H04N 5/93* (2006.01)  
*G11B 27/36* (2006.01)  
*H04N 9/80* (2006.01)

(52) U.S. Cl.  
CPC ..................................... *G11B 27/36* (2013.01)  
USPC ........... 386/294; 386/239; 386/291; 386/295; 386/326; 386/353

(58) Field of Classification Search  
USPC .................. 386/239, 291, 294, 295, 326, 353  
See application file for complete search history.

(56) References Cited

U.S. PATENT DOCUMENTS

| 6,988,153 B2 * | 1/2006 | Furuya | 710/57 |
| 7,020,802 B2 * | 3/2006 | Gross et al. | 714/39 |
| 8,214,621 B2 * | 7/2012 | Obr et al. | 711/173 |

* cited by examiner

*Primary Examiner* — Daquan Zhao  
(74) *Attorney, Agent, or Firm* — Pearl Cohen Zedek Latzer Baratz LLP (57) ABSTRACT

Some embodiments of the present invention refer to an apparatus and method for managing video storages. The method may include periodically receiving parameters indicative of a level of performance of video storage units and detecting up-down states of the video storage units upon receipt of an instruction to record video data. The method may further include detecting writing rates and reading rates of video data associated with the storage units and selecting one of the video storage units to record the video data, based on the parameters received, the detected up-down states, the detected writing rates and the detected reading rates.

20 Claims, 10 Drawing Sheets

METHOD AND APPARATUS FOR MANAGING VIDEO STORAGE

BACKGROUND

Organizations that utilize large numbers of surveillance cameras, such as, casinos, airports, large banks or secured government intuitions, are required to handle thousand of hours of video recordings. In the past, the video data was recorded on cassettes or disks that were stored in cabinets in the security department. Following technological developments and an increase in the amount of recorded hours, the video data is recorded now using video management system (VMS) technologies, which requires the involvement of IT personal.

Video recordings and in particular video recordings for security reasons are carried out 24 hours a day, 7 days a week, 365 days a year. This may require the use of mass storage capacity and managing capabilities to gain the most efficient and reliable recording process.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", allocating, "checking", "receiving", "selecting", "comparing", "reporting", "recording", "detecting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

When use herein, the term "storage unit" may refer to any apparatus, device, system and/or array of devices that is configured to store data, for example, video recordings. The storage unit may include a mass storage device, for example an optical storage device such as a CD, a DVD, or a laser disk; a magnetic storage device such as a tape, a hard disk, Storage Area Network (SAN), a Network Attached Storage (NAS), or the like. The storage unit may include two or more sub-storage units, for example, two or more disks, and the available writing space may include all the free space one each of the sub-storage units included in the storage unit. Additionally, each of the storage units may include the ability to read data from the storage unit for further use, e.g., video files may be read from the storage unit, upon a request, for example, when an investigation of an incident is required.

The storage units may be physically located in the organization facility(ies), for example, a plurality of hard disks physically located in the IT storage room or may be available to the organization via a network connection, for example, Storage Area Network (SAN) or Network Attached Storage (NAS).

As use herein the term "organization" may refer to any organization, company, government institution, either profitable or non-profitable organization that may use a plurality of cameras (e.g., surveillance cameras) to monitor and record activities in a defined area which is under the supervision or influence of the organization. For example, the organization may be airports, police stations, jails, casinos, banks, department stores, companies, industrial facilities or hospitals. An agent of the organization may be any employee or representative of the organization, for example, a banker, a dealer in the casino, the IT and security personal in the organization, medical personal in a hospital or a worker in the industrial facility. A client of the organization may be any person that may acquire a service or supply service to the organization or may be in contact with an agent of the organization in the defined area, for example, a gambler in a casino, a patient in a hospital, a client of the bank or a customer in a department store.

Some embodiments of the invention may be related to recording, in real time, of video data captured in cameras. The data may be encoded or decoded (i.e., compressed or decompressed) using any known video codec, for example, H. 264/MPEG-4 AVC codecs, Microsoft codecs, On2 codecs, H.265, H. 263, etc. The video data may be split or divided, during the recording process into two or more segments, each comprising a portion of the video data. The segments may be recorded in parallel into two different storage units.

Figure 1:
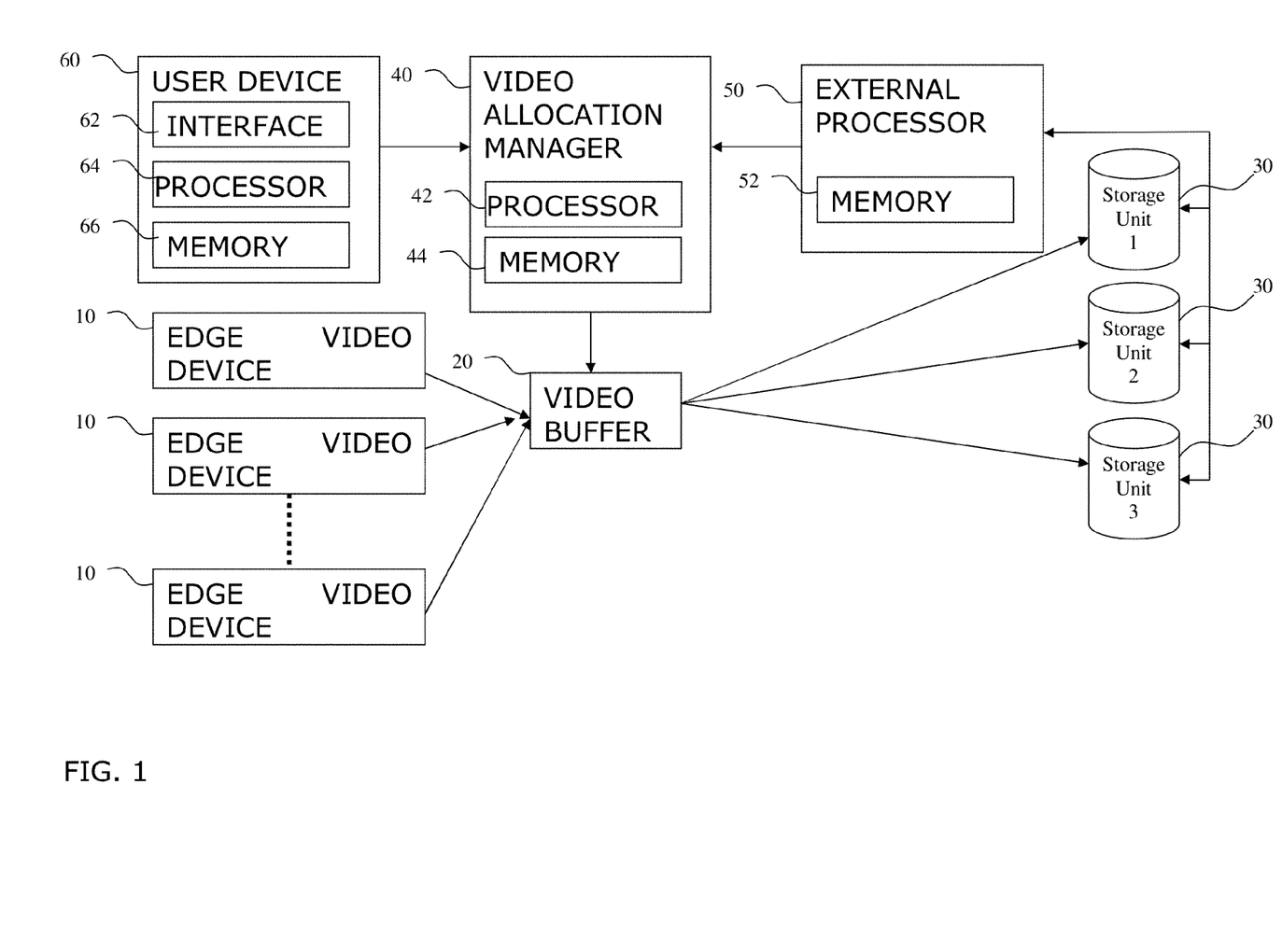
FIG. 1 is a high level block diagram of an exemplary system of a video storage management system in accordance with some embodiments of the present invention.

Reference is now made to FIG. 1 which is a high-level block diagram of a system for capturing, managing and storing video recordings according to some embodiments of the invention. The system may include one or more edge video capturing devices 10, for example, surveillance cameras, a video buffer 20 (or streamer) for streaming video segments captured by devices 10, one or more storage units 30 for storing the video streams, a video allocation management unit (manager) 40 configured to manage the allocations of the video streams into the storage units 30. Video allocation manger 40 may be in communication with one or more external processors 50 and a user device 60.

The video stream from devices 10 may be streamed into video buffer 20 and divided into a plurality of video data streams, each may be stored in one of storage units 30 according to a decision made by allocation manager 40. Allocation manger 40 may receive parameters indicative of the level of performance of video storage units 30 from external processor 50. Allocation manger 40 may receive instructions and inputs from a user via user device 60.

In some embodiments, edge video capturing devices 10 may include two or more video cameras being in an on going communication with video buffer 20 and/or allocation manager 40. The cameras may be for example, surveillance cameras connected in a closed circuit and positioned to capture video signals from a different area or from a different angle in a specific area (e.g., sensitive and/or important area) in the organization's defined area. The video signals, segments or recordings may by processed by video buffer 20 that may split or divide each of the video segments into at least two video streams.

The streams may include similar or different amounts of data or may have similar or different duration. In some embodiments, video buffer 20 may create two or more files containing the same data and allocation manager 40 may split the recordings of the two video data files between two different storage units 30, such that each of the storage unit may back up the other storage unit. In the case that one of the storage units fails and cease to record, the other storage unit may back up and record both video data files and the combined video segment. Such a procedure may allow smoother and more reliable recording.

Each of storage units 30 may be associated with one or more paths for delivering data to be recorded on the storage unit. At least one path should be available for communication, i.e., not engaging in data delivery from other sources, for recording video data received from video buffer 20. Each of storage units 30 may be associated with one or more controllers (not illustrated). At least one associated controller should be active to be able to write data on storage unit 30. The number of active controllers may affect the speed of the data processing and writing the data into storage unit 30.

Each of storage units 30 may include a mass storage device, for example an optical storage device such as a CD, a DVD, or a laser disk; a magnetic storage device such as a tape, a hard disk, Storage Area Network (SAN), a Network Attached Storage (NAS), or the like. The storage unit may include two or more sub-storage units, for example, two or more disks, and the available writing space may include all the free space at each of the sub-storage units included in the storage unit. Storage units 30 may be substantially identical (e.g., assembled from the same components) or may be different. For example, exemplary six storage units 30 being in communication with a single video allocation manager 40 may include, for example, two laser disks, three hard disks and a Storage Area Network (SAN).

Video allocation manager 40 may include a processor 42 and a memory unit 44. Processor 42 may be configured to execute commands included in a program, algorithm or code stored in memory 44. Processor 42 may include components such as, but not limited to, a plurality of central processing units (CPU) or any other suitable multi-purpose or specific processors or controllers, a plurality of input units, a plurality of output units or any other suitable hardware components and/or software components. Processor 42 may be any computation device that is configured to execute various operations included in some methods disclosed herein. Memory 44 may be a non-transitory storage medium that may store instructions to perform operations and/or methods, for example, the method disclosed herein.

Allocation manager 40 may select to record video data captured by edge devices 10 on a particular one or more of storage units 30 based on information received from at least one external processor 50. External processor 50 may be any computer, processor or controller configured to manage storage units using, codes, algorithms, or other software components that may allow controlling and managing storage units, for example, Simple Network Management Protocol (SNMP), Windows Management Instrumentation (WMI) and/or any other network management system. The codes, algorithms, or other software components may be stored in memory 52, included in or being in communication with processor 50.

External processor 50 may monitor several parameters indicative of the level of performance of the storage units 30. For example, processor 50 may monitor the free writing space at each of the storage units 30, the amount of computed power that is available at each storage unit 30 and the number of paths that are available for delivering data to each of the storage units 30. In an exemplary embodiment, a parameter indicative of the amount of free space in a storage unit may be the number of free sub-storage units (e.g., disks) from the plurality of sub-storage units included in the storage unit.

In another exemplary embodiment, a parameter indicative of the amount of computed power that is available at each storage unit 30 may be the number of active controllers from a total number of controllers associated with each of the storage units. In some embodiments, some of storage units 30 may be managed by a first external processor 50 and other storage units 30 may be managed by a second external processor 50. All the storage units 30 and the external processors 50 may be in communication with video allocation manager 40. For example, storage units 30 may be connected to allocation manager 40 via external processor 50, as illustrated in FIG. 1. Alternatively, storage units 30 may be directly connected to allocation manager 40 and further to external processor 50.

Allocation manager 40 may further receive user preferences from a user device 60. Manager 40 may receive instructions to dedicate certain recording channels for specific video data, for example, data received from cameras that are located in predefined areas. User device 60 may be operated by an agent of the company. For example, user device 60 may include a desktop or laptop computer, a tablet or a Smartphone in communication with the company's network. User device 60 may include a user interface 62, a processor 64 and a memory 66. User interface 62 may include any device that allows a user to communicate with a processor. User interface 62 may include a display, a Graphical User Interface (GUI), a mouse, a touch screen, a keyboard, a microphone, an earphone and/or other devices that may allow the user to upload information to processor 64 and receive information from processor 64. Processor 64 may include or may be in communication with memory 66 that may include codes or instructions to be executed by processor 64.

Figure 2:
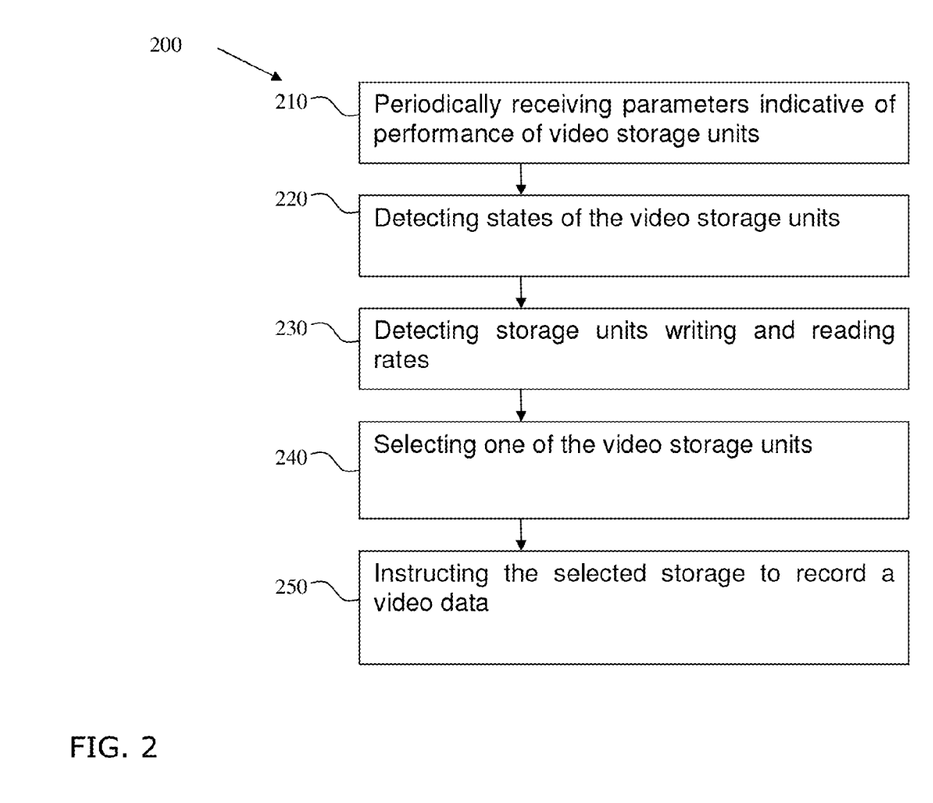
FIG. 2 illustrates a method for managing video storage according to some embodiments of the present invention.

Reference is made to FIG. 2 which shows a method for managing video storage according to some embodiments of the invention. Method 200 described herein with reference to FIG. 2 may be executed by a processor or a controller, for example, by processor 42 of allocation manager 40. The processor may execute instructions stored in memory 44 to perform the methods disclosed herein. Other systems may perform embodiments of the invention as well.

In operation 210, the method may include periodically receiving parameters indicative of the level of performance of video storage units, for example storage units 30. The parameters may include an available space parameter, for example, the number of free disks from a plurality of disks included in the storage unit, a number of available paths from a total number of paths associated with each storage unit, the number of active controllers from a total number of controllers associated with each of the storage units and others. The parameters may be periodically received from external processor 50. External processor 50 may periodically monitor, for each storage unit, parameters indicative of the level of performance of the video storage units and send the data to allocation manager 40.

In operation 220, the method may include detecting the up-down state of the video storage units upon receipt of an instruction to record video data. Processor 42 may use a code written in memory 44, that periodically check if the storage unit is available for writing data (running, "up"), namely, if it is in an up state or on state. An example for such a code may be an algorithm that initially may write a small amount of known data in at least one location at the storage unit and periodically read this data during operation. A successful reading of the data may indicate that the storage is "up" and running while a failure in reading the data may indicate that the storage is not running (off state or down state). The algorithm may mark the failed storage unit as "down" until the next successful check. Such an algorithm is known in the art as a "watchdog algorithm".

In operation 230, the method may include detecting writing rates and reading rates associated with the storage units. Video allocation manager 40 may monitor the writing rates and the reading rates (e.g., in Mbit/sec) for each storage unit 30. Allocation manager 40 may use any code, known in the art, for monitoring the writing and reading rates. In some embodiments, detecting the writing rates and the reading rates may include comparing writing and reading rates detected upon receipt of an instruction to record video data with determined limits for the writing rates and reading rates associated with each of the storage units. The limits may be determined by a user, using user device 60. For example, the writing and reading rates detected may be divided by the determined limits for writing and reading rates associated with each of the storage units.

In operation 240, the method may include selecting one of the video storage units to record the video data, based on the parameters received from the external processor 50, the detected up-down state (on-off state) and the detected writing rates and the detected reading rates of the storage units and in operation 250 the method may include instruct the selected storage unit by allocation manager 40 to record a video data (operation 250). In some embodiments, the selection may be based on one or more of the parameters received from the external processor, the detected up-down (on-off) state, the detected reading writing and the detected reading rates. An exemplary selection may include selecting the storage unit according to predefined rules associated with the performance parameters. For example, a selected storage unit may be associated with optimal performance parameters for example, being always in an "up" state, having the highest writing and reading rates, having the highest number of available controllers and/or having the largest available space.

In yet another example, a storage unit having the highest number of communication paths and/or the highest number of controllers and/or the largest available storage space and/or a storage unit in an "up" state and/or the storage unit with the highest writing and reading rates may be considered as having the best performance. In some embodiments, for a particular storage unit, only some of the above parameters may have "the highest result" (e.g., the number of controllers and writing and reading rates) and some other parameters may have lower (e.g., good, medium or low) results (e.g., the number of path and the free storage space). Receiving of parameters indicative of the level of performance of the video storage units, determining up-down states, determining writing and reading rates and selecting one of the video storage units may be repeated periodically by allocation manager 40.

In some embodiments, if the detected storage unit up-down state indicates that the storage is "down" and not responding, the storage may be marked as "unavailable" for selection. In some embodiments, the method may include determining a rank for each of the storage units based on the parameters indicative of the level of performance of the video storage units, the up-down states (on-off states), the writing rates and the reading rates and selecting one of the video storage units based on the determined rank. A detailed method for ranking storage units and an example for such ranking is given with respect to FIG. 3 and Table 1. The selection may be done using a ranking method that assigns a parameter rank to each of predetermined parameters and calculating a final rank based on the parameter ranks for each storage unit. A method for ranking the storage units and selecting a storage unit based on the ranks is discussed with respect to FIG. 4.

Allocation manager 40 may select two or more storages to for recording the same video data when the video data is divided into two or more video buffers. A method for storing a divided video data is discussed with respect to FIG. 6.

Figure 3:
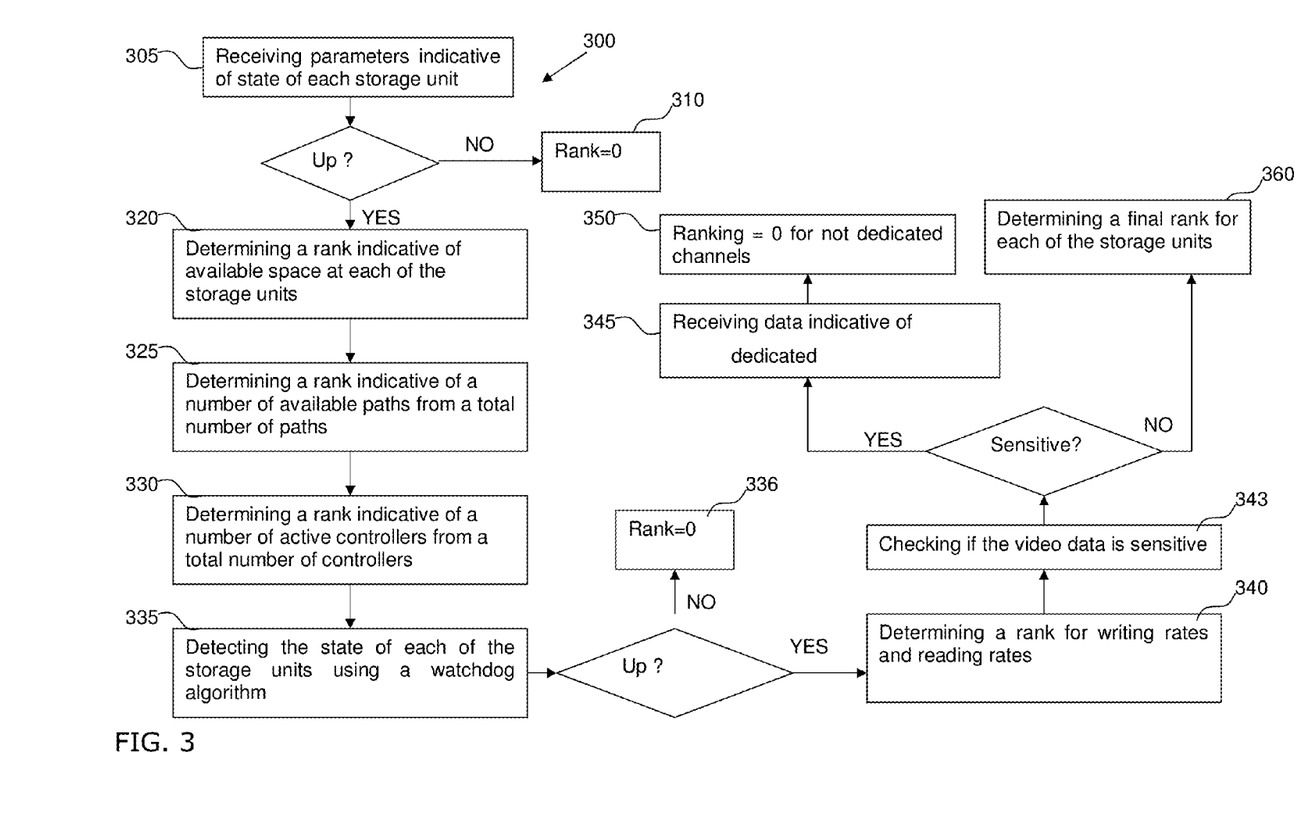
FIG. 3 illustrates a method for ranking storage units according to some embodiments of the present invention.

Reference is made to FIG. 3 illustrating a method for ranking storage units according to some embodiments of the invention. Method 300 may be executed by a processor or a controller, for example, by processor 42 of allocation manager 40. The processor may execute instructions stored in memory 44 to perform the method disclosed herein. Other systems may perform embodiments of the invention as well.

In operation 305, the method may include receiving parameters indicative of the on-off or up-down state of each of storage units 30, for example, from external processor 50. External processor 50 may periodically run a code (e.g., instructions) to detect the state each of the storage units, by detecting is the storage is available for recording data (e.g., "up") or not available (e.g., "down"). If the storage is not available, the storage may be assigned with a up-down state rank of zero (0), (box 310) and no data will be recorded to this storage unit. If the storage unit is "up", further ranking may be done using other parameters.

In operation 320, the method may include determining a rank indicative of the available space at each of the storage units. An example for such a rank may be based on the percentage of available space (free space) from the total writing space in each storage units (e.g., 80%, 50%, 20%). In yet another example, if the storage unit includes a plurality of sub-storage units (e.g., disks), the rank may be based on the ratio between free sub-storage units to the total number of sub-storage units included in each storage unit. The rank may be on a scale of 1-100, or 0.1-1 or any other ranking method. The parameters for determining the rank may be received from at least one external processor 50.

In operation 325, the method may include determining a rank indicative of the number of available paths from the total path leading to each storage unit, for example, the ratio between the number of available paths and the total path leading to each storage unit. The number of available paths and the number total path leading to each storage unit may be received from at least one external processor 50 managing each storage unit. The rank may be on a scale of 1-100, 0.1-1 or any other ranking method. For example, the highest path parameter rank of a storage unit may indicate the fastest storage unit to record video data or the more accessible storage unit for recording the video data.

In operation 330, the method may include determining a rank indicative of the number of active controllers from the total number of controllers available to each storage units. For example, the rank may be the ratio between the number of active controllers and the total number of controllers available. The number of active controllers and the total number of controllers available may be received from at least one external processor 50. The rank may be on a scale of 1-100, 0.1-1 or any other ranking method. For example, the highest the rank of a storage unit, the faster it may be to record video data into that storage unit. In yet another example, the higher the rank of a storage unit, the more accessible is the storage unit, such that the better are the chances of the data to be recorded (uninterruptedly) in the storage unit.

In operation 335, the method may include detecting again an up-down state of each storage unit, using this time a code preformed by allocation manager 40. The code may be a "watchdog" algorithm stored in memory 44 and executed by processor 42. The code may include instructions for periodically detecting if each of the storage units is "up" or "down". If the storage is not available, the storage may receive a rank of zero (0), (box 336), and no data will be recorded on this storage unit. If the storage unit is "up", the ranking process may continue with additional parameters.

In operation 340, the method may include determining a rank indicative of the writing rates and reading rates associated with the storage units. The ranking may include comparing writing and reading rates detected upon receipt of an instruction to record video data, with determined performance limits for the writing and reading rates associated with each of the storage units. Allocation manger 40 may detect, upon receipt of an instruction to record video data, the writing and reading rates for each storage unit. The determined performance limit for the writing and reading rates, associated with each of the storage units, may be received from a user using, for example, user device 60.

Figure 8:
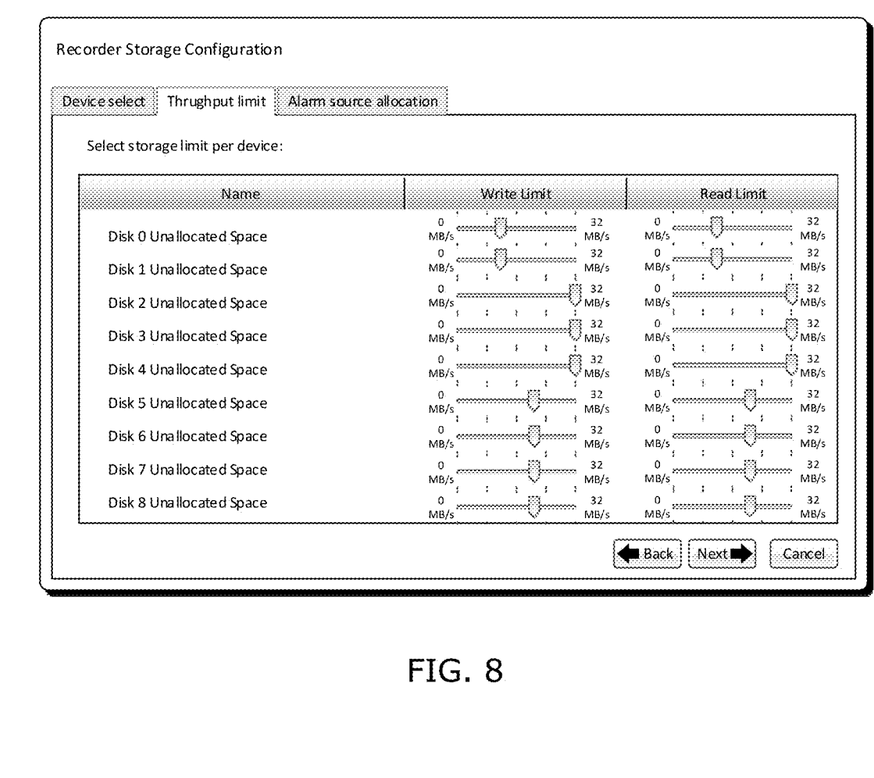
FIG. 8 is an illustration of an exemplary screen included in a user interface for selecting performance limits of storage units according to some embodiments of the invention.

A non-limiting example of a screen for determining performance limits which may be displayed on a display associated with the user device, for example, user interface 62 of user device 60 is shown in FIG. 8. The rank may include the ratios between the detected writing rate and the determined writing limit, and the detected reading rate and the determined reading limit. The rank may include two ranks, one for writing and one for reading, or a combined rank that takes in to account both the writing and reading ranks. The rank may be on a scale of 1-100, or 0.1-1 or any other rank For example, the higher the rank of a storage unit, the faster it may be to record a video data into that storage unit. In yet another example, the higher the rank of a storage unit the more accessible is the storage unit, such that the better are the chances of the data to be recorded (uninterruptedly) in the storage unit.

In some embodiments, the user may determine at least one dedicated channel for video recording. In operation 343, the method may include checking if the video data should be recorded only on one or more specific storage units based on predefined rules. For example, the video data may be defined as a sensitive video data to be stored in a specific channel or storage unit. As used herein, "sensitive" video data is any video data that may potentially include sensitive information for the organization that should be better protected.

For example, a sensitive video data may be a video captured from a sensitive area (e.g., inside a safe of a bank or a casino) or recoded during a predetermined period (e.g., during deposits of large some of money). When a sensitive video data is recorded, for example, by edge video device 10, this sensitive video data may be recorded only in one or more predetermined storage units, for example, a storage unit having a better protection (e.g., a better firewall). The sensitive data may be channeled to be recorded in the selected storage unit, regardless of its other performance levels (e.g., the writing and reading rates).

If it is determined that the video data could be recorded only in a portion of the storage units, for example secured storage units, the method may include receiving, for a particular storage unit, data indicative that the unit has a dedicated channel for storing particular data (operation 345). If dedicated channels exist, all other units may be ranked as zero (0) to indicate that the sensitive video data should not be recorded in those storage units (operation 350). If more than one storage unit has dedicated channel(s), allocation manger 40 may continue and rank the dedicated storage units according to their performance parameters.

If recording of the video data is not restricted only to specific storage units and the data is not considered sensitive data, the method may include determining a final rank for each of the storage units based on one or more of the parameter ranks (operation 360). The final rank may include a sum, an average, a weighted average or any other mathematical relation between the one or more of parameter ranks.

Table 1 summarizes exemplary results of the ranking method according to some embodiments of the invention for 5 storage units. The ranking parameters include parameters received from external processor 50: the up-down state, the number of available paths from the plurality of paths and the number of available controllers from the plurality of controllers. The parameters further include the up-down state detected by a "watchdog algorithm", the reading rates and the writing rates; the limits set for the reading rates and the writing rates and units dedication.

TABLE 1

| Storage name | Storage state | # Paths (out of total) | controllers (out of total) | Storage space TeraBit | Detected rates | Storage watch-dog | Limited rates | Dedi-cation | Rank |
|---|---|---|---|---|---|---|---|---|---|
| Unit 1 | Up | 4 (4) | 2 (2) | 1 | 32 MB/s Wr<br>1 MB/s Rd | Up | 32 MB/s Wr<br>3.2 MB/s Rd | N/A | 0 |
| Unit 2 | Up | 4 (4) | 2 (2) | 1 | 15 MB/s Wr<br>0 MB/s Rd | Up | 32 MB/s Wr<br>3.2 MB/s Rd | N/A | 50 |
| Unit 3 | Down | 4 (4) | 2 (2) | 1 | 0 MB/s Wr<br>0 MB/s Rd | Down | 32 MB/s Wr<br>3.2 MB/s Rd | N/A | 0 |
| Unit 4 | Up | 2 (4) | 1 (2) | 1 | 15 MB/s Wr<br>0 MB/s Rd | Up | 32 MB/s Wr<br>3.2 MB/s Rd | N/A | 50 |
| Unit 5 | up | 4 (4) | 2 (2) | 1 | 5 MB/s Wr<br>2 MB/s Rd | Up | 32 MB/s Wr<br>3.2 MB/s Rd | 1, 2,<br>3, 4 | 100 |

In an exemplary scenario, storage unit No. 3 is down therefore has a rank value of zero (0); In storage unit No. 1, the writing rate has reached the performance limit, thus no additional writing can be done and the rank value is zero (0). In storage unit No. 5 all paths and the controllers are available, the detected writing rates and reading rates are far from the limits and 4 channels are assigned for sensitive data, accordingly the rank value of storage unit No. 5 is 100. In storage unit 2, all the paths and the controllers are available, however half of the allowed bandwidth was used, accordingly the rank value of storage unit No. 2 is 50; and in storage unit 4 the writing and reading rates are far from the maximum, however half of the controllers and half of the paths are not available, accordingly the rank value of storage unit No. 4 is 50.

In some embodiments, method 300 may include storing historical records of at least one of the parameters indicative of the level of performance of video storage units, the determined states and the determined writing and reading rates. Allocation manager 40 may store at least one of the parameters and/or the ranks determined based on the parameters. Manager 40 may store the final rank or any one of the parameter ranks associated with the different storage units. The method may further include updating the rank of each storage unit based on the stored historical records. For example, if a storage unit received a relatively high rank (e.g., rank value of 80), and according to the historical records in 50% of the time a rank was determined for this storage, the storage was "down" and its rank was zero. In this case, the final rank value for this storage may be lower than 80. For example, the rank value 80 may be decrease by half (by 50%) because half of the time this storage unit was "down" such that the final rank value for this storage unit is 40.

Figure 4:
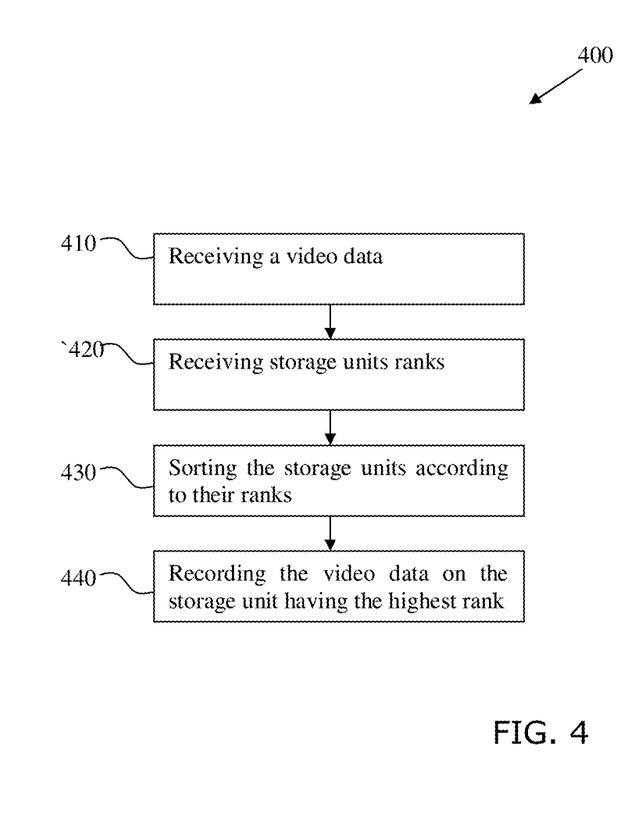
FIG. 4 illustrates a method for recording video data in storage units according to some embodiments of the present invention.

Reference is made to FIG. 4, which illustrates a method for recording video data according to some embodiments of the invention. Method 400 may be executed by a processor or a controller, for example, by processor 42 of allocation manager 40. The processor may execute instructions stored in memory 44 to perform the method disclosed herein. In operation 410, the method may include receiving a video data, for example, from video buffer 20. The video data may be captured by any of the edge video devices 10. In operation 420, the method may include receiving ranks for each of the storage units 30 being in communication with video buffer 20. The ranks for each storage unit 30 may be determined according to method 300, presented above. In operation 430, the method may include sorting the storage units according to their ranks. Allocation manager 40 may sort storage units 30 according to the final rank received in operation 360, or according to any other rank(s) received in one or more of operations 305-350. In operation 440, the method may include recording the video data in the storage unit having the highest rank.

In some embodiments, the video data may be divided, during the recording, into two or more new video data (e.g., two video streams) each being recorded in a separate storage unit 30 (e.g., a first and a second storage units). The division may allow a smoother writing experience, with fewer disturbances. The division may further reduce the risk of failure, such that in case one of the storage units is "down" (e.g., the first storage unit) at the middle of the recording, allocation manager 40 may instruct the other storage unit(s) (e.g., the second storage unit) to also record the divided part that should have been to be recorded in the first storage unit. Splitting the video data to multiple streams may allow better use of the available storage units in the form of load balancing between all storage units and allowing simultaneous redundancy. In some embodiments, the amount of data included in a video data could not be recorded in single storage unit, and the data must be divided into at least two streams. The splitting may allow storing relatively large video data on any existing storage units available to the organization, as long as the total storage space available in all storage units is larger than the video data.

Figure 5:
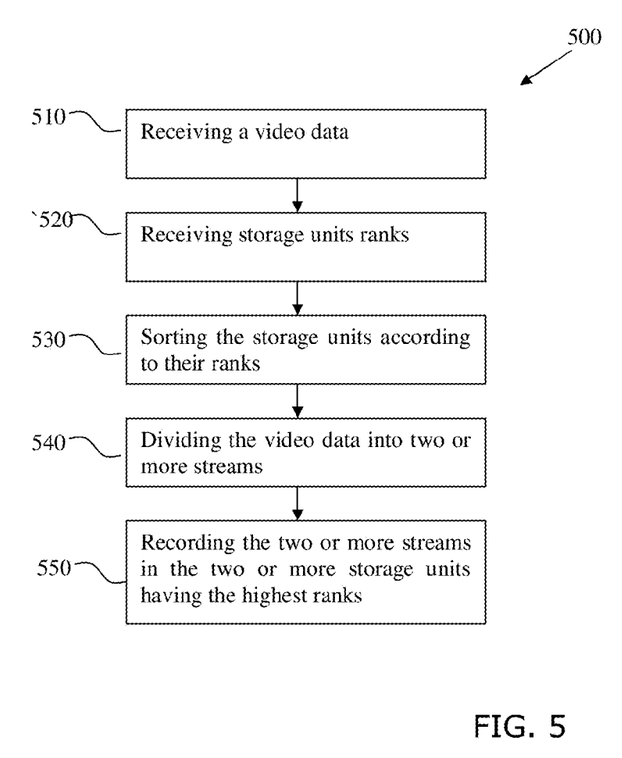
FIG. 5 illustrates a method for recording a divided video data according to some embodiments of the invention.

Reference is made to FIG. 5 that illustrates a method for recording a video data according to some embodiments of the invention. Method 500 may be executed by a processor or a controller, for example, by processor 42 of allocation manager 40. Operations 510-530 may be substantially identical to operations 410-430 disclosed in method 400, thus will not be discussed again. In operation 540, the method may include dividing the video data into two or more video streams each comprising a portion of the video data such that each of the portions is recorded during the same period of time. For example, allocation manager 40 may order video buffer 20 to divide the video data during the recording of the data into two portions being recorded at the same time. In operation 550, the method may include recording the divided video data in two or more of the storage units having the highest ranks.

In some embodiments, the system may allow a user (e.g., an agent of the organization) to upload additional parameters for allocating storage units. For example, the user may select the initial group of storage units and direct them to communicate with allocation manager 40. The user may select dedicated channels for at least one storage units from the storage units communicating with allocation manager 40. In yet another example, the user may select writing rates and reading rates limits for at least some of the storage units. In some embodiments, the user may select which one of the operations included in methods 200 and 300 may be applied for selecting a storage unit. For example, the user may select to apply only operation 220 (detecting a state of a storage unit) and operation 230 (detecting storage units writing and reading rates), and allocation manager 40 may execute only this two operations and select the video storage unit, based on these two stages.

Figure 6:
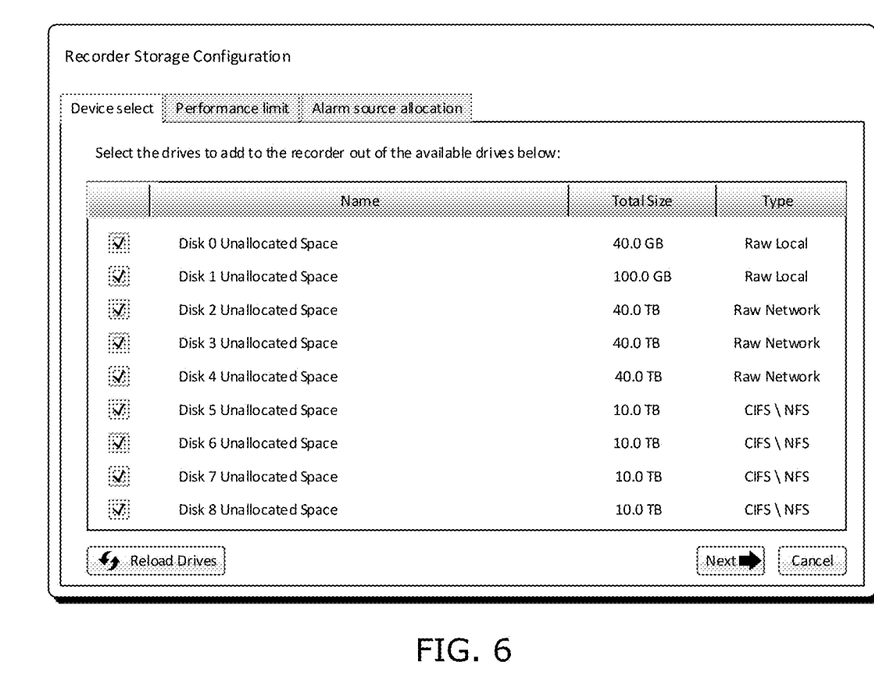
FIG. 6 is an illustration of an exemplary screen included in a user interface according to some embodiments of the invention.

FIG. 6 is an illustration of an exemplary screen displayed to the user. The display includes a table for selecting a storage unit according to some embodiments of the invention. The screen may be displayed to the user on a display included in user interface 62. The user may select the storage units based on the total storing space and the type of unit, using for example, a mouse, a keyboard or a touch screen. The selection may be transferred from processor 64 to processor 42 included in allocation manager 40. Allocation manager 40 may apply methods 200-500 using only the selected storage units.

Figure 7:
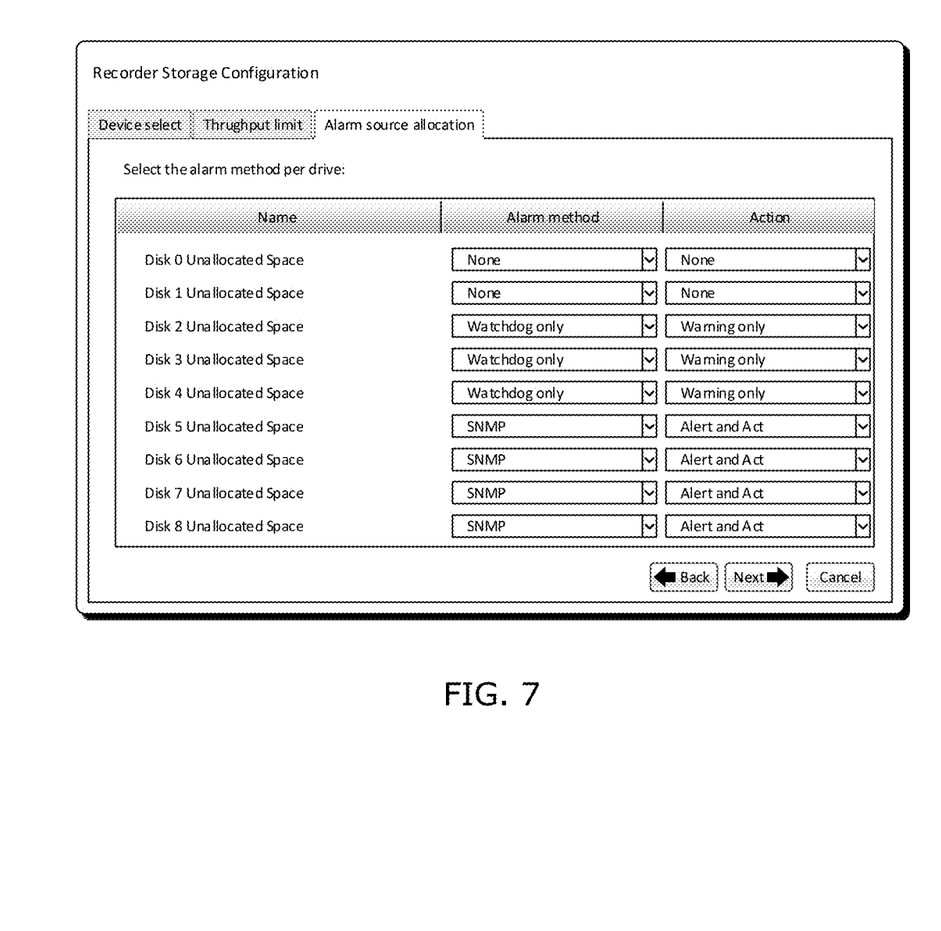
FIG. 7 is an illustration of an exemplary screen included in a user interface for presenting to the user status of storage units according to some embodiments of the invention.

FIG. 7 is an illustration of an exemplary screen displayed to the user. The display includes a table for selecting which one of operations 210-250 and/or 305-350 will be used to monitor and/or rank any one of the available storage units. For example, the user may select (e.g., using any device included in user interface 62) to use only a "watchdog" algorithm (e.g., operations 220 or 335) or to monitor parameters received from an external processor using, for example, a SNMP or WMI code (e.g., operation 210 or operations 320-330). The user may further select if an alarm may be sent once a problem is detected in one of the storage units, based on the monitored parameters (e.g., if the performance of the storage unit is below a threshold value). The user may decide if to intervene or not, based on additional preferences that are not included in the algorithm. If the user does not intervene, allocation manager 40 continues to perform the allocation according to any one of the methods disclosed herein. If the user intervenes, the user may over rule a decision made according to one of the methods disclosed above.

Reference is now made to FIG. 8 that illustrates an exemplary screen displayed to the user. The display includes a table for selecting writing rates and reading rates limits for each storage unit. The user may use a mouse a keyboard or a touch screen to move the cursers left or right and increase or decrease the limits.

Improved performance of video recording when dividing the video data between two storage units was first demonstrated by comparing recording video data on a single storage unit having a single controller relative to recording the same video data divided between two storage units (each identical to the single storage unit) having two controllers (each connected to a respective storage unit). In both cases the video data was of the same size, namely, the same load was handled by the single storage unit and by the two storage units. Table 2 summarizes the maximum total recording rates (i.e., throughput) measured. The maximum total recording rate measured in MB/sec units was 43 MB/sec for the single storage unit and 88.7 MB/sec for the two storage units configuration. It is seen that the performance was improved by 206% (more than doubled).

TABLE 2

| Setup | Maximum total recording rate (MB/s) | Performance improvement |
| --- | --- | --- |
| Single storage unit (one controller + 5 sub-units) | 43 | 206% |
| Two storage units (two controllers + 10 sub-units) | 88.7 | |

The improved performance of video recording when dividing the video data between two storage units can also be demonstrated by comparing the recording rates over time and their degree of smoothness and stability. The throughput (desired rate of writing) is kept the same when recording to a single storage unit or dividing the recording between two storage units.

Figure 9A:
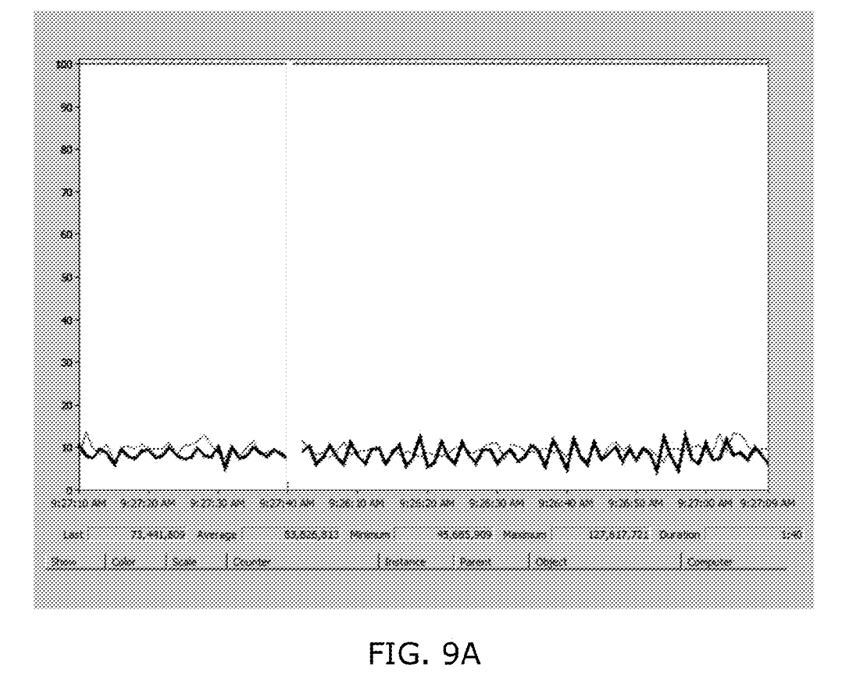
FIGS. 9A and 9B are illustration of graphs presenting measurements of writing rates according to some embodiments of the invention.
Figure 9B:
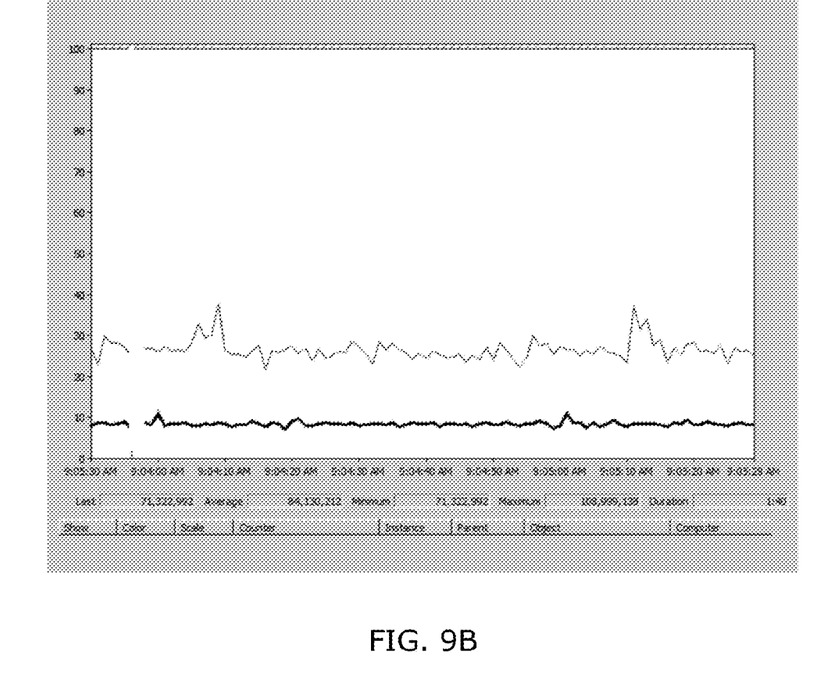

FIGS. 9A and 9B show graphs from a standard performance monitoring software. FIG. 9A shows the recording rate (writing rate) over time when recording on a single storage unit having 5 sub-storage units and FIG. 9B shows the recording rate over time when recording the same data divided between two storage units, each similar to the single storage unit.

The bold darker graph represents the writing rate measured in Gbit/sec units over time. The lighter graph represents is the Central Processing Unit (CPU) rate which is a default measurement of the monitoring software. As demonstrated by the darker lines, the differences (e.g., jumps) in the amount of data that is recorded over time are smaller when data is divided and recorded in two storage units. Therefore, the recording is smoother when dividing the data between storage units.

Although the average recording rate is the same (approximately 9 Gbit/sec) it is clear that dividing the video data to be recorded into two storage units resulted in a much smoother operation (i.e., smaller differences between maxima and minima of the writing rates) than recording the same data using a single storage unit.

While certain features of the invention have been illustrated and described herein, many modifications, substitutions, changes, and equivalents may occur to those skilled in the art. It is, therefore, to be understood that the appended claims are intended to cover all such modifications and changes that fall within the true spirit of the invention.

What is claimed is:

1. A method for managing video storage comprising:
periodically receiving parameters indicative of a level of performance of video storage units;
detecting up-down states of the video storage units upon receipt of an instruction to record video data;
detecting writing rates and reading rates of video data associated with the storage units; and
selecting one of the video storage units, to record the video data, based on the parameters received, the detected up-down states, and the detected writing rates and the detected reading rates.

2. The method of claim 1, wherein the parameters indicative the level of performances of the video storage units comprise available spaces at each of the storage units.

3. The method of claim 1, wherein the parameters indicative of the level of performances of the video storage units comprise numbers of available paths from a total number of paths associated with each of the storage units.

4. The method of claim 1, wherein the parameters indicative of the level of performances of the video storage units comprise numbers of active controllers from a total number of controllers associated with each of the storage units.

5. The method of claim 1, wherein detecting the writing rates and reading rates comprises comparing writing rates and reading rates, detected upon receipt of an instruction to record video data, with determined performance limit for the writing rates and reading rates associated with each of the storage units.

6. The method of claim 1, comprising receiving data indicative of a dedicated channel for video recording associated with at least one channel from a plurality of channels associated with each of the storage units.

7. The method of claim 1, comprising:
   determining a rank for each of the storage units based on the parameters indicative of the level of performance of the video storage units, the determined states and the determined writing rates and reading rates; and
   selecting one of the video storage units based on the determined rank.

8. The method of claim 7, wherein the selected storage unit is the storage unit having the highest rank.

9. The method of claim 7, comprising splitting the recording of the video data between two storage units having the highest ranks.

10. The method of claim 7, comprising:
    storing historical records of at least one of: the parameters indicative of the level of performance of the video storage units, the determined states and the determined writing and reading rates; and
    updating the rank of each storage unit based on the stored historical records.

11. The method of claim 1, comprising splitting the recording of the video data between two storage units from the storage units.

12. The method of claim 1, wherein detecting the writing rates and reading rates comprises dividing writing rates and reading rates detected upon receipt of an instruction to record video data with performance limit writing rates and reading rates associated with each of the storage units.

13. The method of claim 12, wherein the performance limit writing rates and reading rates are determined by a user.

14. An apparatus for managing video storage comprising:
    at least one processor configured for:
      periodically receive parameters indicative of a level of performance of video storage units;
      detect up-down states of the video storage units upon receipt of an instruction to record video data;
      detect writing rates and reading rates associated with the storage units; and
      select one of the video storage units, to record the video data, based on the parameters received, the detected up-down states, and the detected writing rates and reading rates.

15. The apparatus of claim 14, wherein the processor detects the writing rates and reading rates by comparing writing rates and reading rates, detected upon receipt of an instruction to record video data, with determined performance limit for the writing rates and reading rates associated with each of the storage units.

16. The apparatus of claim 14, wherein the processor is further configured to receive data indicative of dedicated channels for video recording associated with at least one channel from a plurality of channels included in each of the storage units.

17. The apparatus of claim 14, wherein the processor is further configured to:
    determine a rank for each of the storage units based on the parameters indicative of the level of performance of the video storage units, the determined up-down states and the determined writing rates and reading rates; and
    select one of the video storage units based on the determined rank.

18. The apparatus of claim 17, wherein the processor is further configured to:
    storing historical records of at least one of: the parameters indicative of the level of performance of video storage units, the determined up-down states and the determined writing rates and reading rates; and
    updating the rank of each storage unit based on the stored historical records.

19. An article comprising a non-transitory computer-readable storage medium, having stored thereon instructions, that when executed by a processor, cause the processor to:
    periodically receive parameters indicative of the level of performance of video storage units;
    detect up-down states of the video storage units upon receipt of an instruction to record video data;
    detect writing rates and reading rates associated with the storage units; and
    select one of the video storage units, to record the video data, based on the parameters received, the detected states, and the detected writing and reading rates.

20. The article of claim 19, wherein the instructions when executed further result in:
    determine a rank for each of the storage units based on the parameters indicative of the level of performance of the video storage units, the determined states and the determined writing and reading rates; and
    select one of the video storage units based on the determined rank.

* * * * *